3,590,005
EMULSIFIER COMPOSITIONS AND EMULSIONS
CONTAINING THE SAME
John T. Foley, Verona, and Bernard R. Bluestein, Glen
Rock, N.J., assignors to Witco Chemical Corporation,
New York, N.Y.
No Drawing. Filed Mar. 6, 1968, Ser. No. 710,763
Int. Cl. B01j 13/00
U.S. Cl. 252—308                                    19 Claims

ABSTRACT OF THE DISCLOSURE

Emulsifier compositions comprising admixtures of (a) between about 10% and 90% by weight of an oxidized hydrocarbon wax-amine condensation product and (b) between about 90% and 10% of a metal salt of an oxidized hydrocarbon wax, said emulsifier compositions being particularly effective for preparing water-in-oil emulsions that are stable in the presence of electrolytes and at temperatures as high as about 260° C.

---

The present invention relates to novel emulsifier compositions and also to the production of stable water-in-oil emulsions containing said emulsifier compositions.

It is often desired to prepare emulsions of water and oil. Emulsions of water in various oleaginous media wherein the oleaginous material is the continuous phase and water or aqueous material is the dispersed phase have been employed for numerous applications as, for instance, oil well drilling muds, cutting oils, hydraulic fluids, lubricants, cosmetics, agricultural emulsions, etc., where the lubricating, corrosion protection or cosmetic characteristics of the oleaginous material is desired, and the water or aqueous material serves to bring about fire resistance, etc. Such emulsions are commonly prepared prior to use so as to insure proper formulation, or they may be formed in situ where, for instance, environmental moisture is emulsified thereby reducing corrosion problems or preventing the water from being absorbed by the surroundings.

Numerous emulsifiers and emulsifier compositions have been employed in preparing water-in-oil emulsions. However, at least most of known emulsifier compositions are generally unsatisfactory for the preparation of emulsions containing aqueous solutions of electrolytes and particularly for use in high temperature environment, as, for instance, of the order of about 260° C.

In accordance with the present invention, certain emulsifier compositions have been evolved comprising admixtures of (a) condensation reaction product of certain oxidized hydrocarbon waxes and amines and (b) metal salts of oxidized hydrocarbon waxes, which, it has been found, are highly effective for preparing water-in-oil emulsions which are stable at elevated temperatures and in the presence of electrolytes.

The oxidized hydrocarbon waxes that are suitable for use in preparing the emulsifier compositions of the present invention are those oxidized waxes derived from the paraffin waxes, microcrystalline waxes and synthetic Fischer-Tropsch waxes, said oxidized waxes generally containing from 18 to 100 carbon atoms per molecule, and having saponification values of between about 15 and 160, acid values of from about 5 to 60, and molecular weight of between about 280 and 1600. Most suitable and preferred, particularly when high temperature emulsion stability at about 260° C. may be desired, are the oxidized wax products derived from microcrystalline and Fischer-Tropsch waxes containing from about 35 to 80 carbon atoms per molecule on the average, and having a saponification value of 25 to 95, an acid value of about 10 to about 60, and molecular weight between about 330 and about 800. Further, the preferred oxidized waxes are derived from predominantly paraffinic waxes and contain a minimum of cyclic hydrocarbon groups.

Amines suitable as reactants with the oxidized hydrocarbon wax to produce the condensation products used as the (a) ingredient of the emulsifier compositions of the present invention are primary-secondary aliphatic polyamines containing at least one primary amino group and at least one secondary amino group or a second primary amino group separated from the first primary amino group by two or three carbon atoms. Still other suitable amines are hydroxyalkyl amines or alkanolamines. Illustrative examples of such amines are ethylene diamine, diethylene triamine, triethylene tetramine and tetraethylene pentamine, particularly suitable and preferred being triethylene tetramine and tetraethylene pentamine; 1,3-propylene diamine, trimethylene diamine, 1,3-diaminobutane, 2,4-diaminopentane, N-ethyl-trimethylene diamine, N-aminoethyl-trimethylene diamine, aminopropyl stearylamine, tripropylene tetramine and tetrapropylene pentamine; high boiling polyamines prepared by the condensation of 1,3-propylene dichloride with ammonia, and similar diamines or polyamines in which there occurs at least one primary amino group separated from another primary or secondary amino group by three carbon atoms; ethanolamine, diethanolamine, isopropanolamine, diisopropanolamine, hydroxyethyl ethylene diamine, hydroxypropyl propylene diamine, and the like.

In preparing the oxidized wax-amine condensation products employed in the emulsifier compositions of the present invention, sufficient oxidized wax should be used to provide at least about 1 carboxyl group and preferably 2 carboxyl groups per mole of amine, the saponification value of the oxidized wax being useful in determining the carboxyl content.

The metal salts of the oxidized hydrocarbon waxes suitable for use as the (b) ingredient in the emulsifier compositions of the present invention include the alkali metal and alkaline earth metal salts of the oxidized hydrocarbon waxes hereinabove described. Suitable, for example, are the sodium, potassium, calcium, barium, lithium, and magnesium salts of the oxidized waxes. Also suitable are the copper, aluminum, chromium and lead salts. Most suitable and preferred are the calcium salts of the oxidized waxes.

The emulsifier compositions of the present invention may be prepared by initially forming the oxidized wax-amine condensation product. This may be done in any one of a variety of ways as, for instance, by reacting under vigorous agitation about 1 mole of the hereinabove described amine with at least 1 equivalent weight of the hereinabove described oxidized wax and preferably about 2 equivalent weights of said oxidized wax at a temperature between about 100 and 175° C. The batch is kept under vacuum or an inert gas to facilitate removal of water formed during the reaction. The reaction is considered to be complete when evolution of water ceases, commonly after about 2 to 6 hours.

A desired amount of additional oxidized wax is then added to the reaction batch which has been maintained at a temperature between about 100° C. and 130° C. (depending on the melting point of the oxidized wax). A stoichiometric excess of sodium or potassium hydroxide as an aqueous solution is slowly added to the batch to completely saponify the unreacted oxidized wax. The reaction batch is maintained at temperature while stirring until gelation begins, usually about 10–30 minutes.

The amount of excess caustic used to saponify the oxidized wax is preferably at least about 10% and may be 100% or even higher as determined from the saponification value of the oxidized wax. When it is desired to prepare a salt of the oxidized wax other than the sodium or potassium salt, a stoichiometric excess of at least about 10% and preferably at least 25% to 100% excess of a solution containing the desired metal salt is then added with agitation. The reaction batch is then mixed at high speed until a uniform emulsion forms, then cooled, dried and ground to a powder.

Alternatively, the emulsifier compositions may be prepared by first reacting the requisite portion of amines with an excess of the oxidized hydrocarbon wax, the amount of said oxidized wax employed being equivalent to that required to produce the admixture composition of the present invention. The reaction conditions are as described above and, after the condensation reaction has been completed, the requisite amount of sodium or potassium hydroxide solution is slowly added to completely saponify the unreacted oxidized wax.

Still another alternative to proceeding as above to produce the emulsifier compositions of the present invention is separately to prepare the (a) and (b) components of the emulsifier compositions and then mix together the desired quantities thereof in suitable form, for instance in powder form or solid form, and then grind them together to obtain a reasonably homogeneous mixture.

The emulsifier compositions of the present invention comprise, by weight, an admixture of (a) from about 90% to 10% and preferably 75% to 25% of the oxidized wax-amine condensation product hereinabove described and (b) from about 10% to 90% and preferably from about 25% to 75% of a metal salt of the oxidized wax as hereinabove described, said percentages being by weight. Generally, admixtures comprising 50% by weight of the oxidized wax-amine condensation product and about 50% by weight of the oxidized wax metal salt have been found to be most desirable.

Water-in-oil emulsions prepared in accordance with the present invention, utilizing the above described emulsifier compositions, comprise from about 1 to 97 parts by weight of water or aqueous electrolyte solution as the dispersed phase, from about 99 to 3 parts by weight of oleaginous material as the continuous phase, and at least about 1% and preferably between about 2% and 6% by weight, based on the weight of the aqueous and oleaginous phases of the emulsion, of the emulsifier compositions of the present invention. It is particularly desirable that the emulsions contain from about 30 to 70 parts by weight of water or aqueous electrolyte solution as the dispersed phase, from about 70 to 30 parts by weight of oleaginous material as the continuous phase, and about 3 to 4 parts by weight of the emulsifier composition. In general, particularly good results are obtained when the emulsions contain at least about 0.5% by weight and, better yet, at least about 1.5% by weight of each of the (a) and (b) ingredients of the emulsifier compositions of the present invention.

The water-in-oil emulsions prepared in accordance with the practice of the present invention have the advantages of being prepared with a wide range of water or aqueous electrolyte solutions and, in addition, of being stable for extended periods of time even at elevated temperatures, surprisingly exhibiting little or no tendency to invert into oil-in-water emulsions even when containing large amounts of water or aqueous electrolyte solutions. The aqueous dispersed phase of stable emulsions which can be made pursuant to the present invention may contain as much as 30% by weight of electrolytes such as inorganic salts of the alkali metals and alkaline earth metals.

Oleaginous materials suitable for use in the emulsions of the present invention can be selected from wide groups, of animal, vegetable or mineral characters such as animal and vegetable oils and fats, and hydrocarbons of paraffinic base, naphthene base and mixed paraffin-naphthene base petroleum oils having SUS viscosities at 100° F. ranging to 1500, aromatic and aliphatic solvents as, for example, chlorinated hydrocarbon solvents, toluene, xylenes, benzene, naphthalene and the like, which are generally water-insoluble, and synthetic lubricating oil of the ester or ether types, particularly satisfactory being mineral oils or mineral-based oils.

The water-in-oil emulsions of this invention may be produced by dispersing the requisite amount of emulsifier composition prepared in accordance with the practice of the present invention in the oleaginous constituent and then adding the aqueous constituent with agitation. It has also been found that stable water-in-oil emulsions can be prepared in situ with water or aqueous electrolyte solutions found in various environments, for example, by pumping oleaginous materials herein described containing the requisite portions of the emulsifier compositions of the present invention into contact with the water or aqueous electrolyte solutions.

Various supplemental materials may be incorporated into the emulsions of the present invention provided that the material added is compatible with the emulsions and, where extreme high temperature stability is a desideratum, that it does not destroy or adversely affect its high temperature properties. Illustratively, minor amounts, e.g., less than about 5% or 10% by weight of the emulsions, of surfactants such as the following can be added: alkyl aryl sulfonates; ethoxylated fatty alcohols; sulfated fatty alcohols; sulfonated unsaturated fatty acids; polypropylene glycol oleates; phosphated mono- and diglycerides and mono- and diphosphate esters of aliphatic and aromatic hydroxy-containing compounds and alkylene oxide adducts of such hydroxy-containing compounds.

The following examples are illustrative of the practice of the present invention but they are not to be construed in any way as limitative of the full scope of the invention, since various changes and modifications can be made in light of the guiding principles and teachings disclosed herein. All temperatures recited are in degrees centigrade.

EXAMPLE 1

335 g. (2 equivalent weights) of oxidized microcrystalline wax and 90 g. (1 equivalent weight) of tetraethylene pentamine were mixed together and heated to about 150°. While maintaining a temperature of about 150° the reaction was allowed to proceed with agitation under a vacuum of about 26 Hg for 4 hours during which period water evolution ceased and 8.5 cc. of water was collected. The reaction batch was then allowed to cool to about 110° and maintained at that temperature while an additional 350 g. of oxidized microcrystalline wax was added while continuing to agitate the batch. 140 g. of 50% aqueous sodium hydroxide was then slowly added with agitation to the batch of melted wax. About 10 minutes after the sodium hydroxide was completely incorporated, gelation started to occur, and 210 g. of 30% aqueous calcium chloride were then added while mixing the reaction mass at high speed to insure the formation of a uniform emulsion. The batch mass was then dried, cooled and ground to powder.

The oxidized microcrystalline wax used in this example to prepare the emulsifier composition had an acid number of 30, a saponification value of 70 and melting point of about 85°.

The following emulsions were prepared using the emulsifier composition prepared above:

Emulsion A:
  Kerosene—175 cc.
  Fresh water—175 cc.
  Powdered emulsifier—9 g.
Emulsion B:
  Kerosene—175 cc.
  Brine water (20% NaCl, 10% $CaCl_2$)—175 cc.
  Powdered emulsifier—9 g.

Emulsions A and B were prepared by dispersing the powdered emulsifier in the kerosene and then adding the water phase with agitation. The water-in-oil emulsions prepared from both compositions were stable, exhibiting no separation of either phase after aging 1 month at room temperature and 4 hours at 260° in a closed container.

EXAMPLE 2

(a) 500 g. of an oxidized microcrystalline wax, having a saponification value of 50 and acid number of 30, and 65 g. of triethylene tetramine were heated together at about 175° for about 3 hours under a vacuum of about 26" Hg after which time the evolution of water ceased. The product solidified into a hard brown wax upon cooling to room temperature.

(b) 250 g. of the oxidized microcrystalline wax used in part (a) was heated to about 115° and 100 g. of 50% aqueous sodium hydroxide was slowly added to the melted wax with agitation. Agitation of the hot batch was continued for about 10 minutes at which time gelation began. 150 g. of 30% aqueous calcium chloride was then added to the hot wax while mixing at high speed until a uniform emulsion was formed. The batch was then dried and cooled.

(c) Equal parts of each of the reaction products of parts (a) and (b) were then mixed and ground to a powder.

The following emulsions were prepared using the emulsifier composition of part (c).

Emulsion A:
  Mineral oil (100 SUS at 100° F.)—175 cc.
  Fresh water—175 cc.
  Powdered emulsifier—9 g.
Emulsion B:
  Mineral oil (100 SUS at 100° F.)—175 cc.
  Brine water (20% NaCl, 10% $CaCl_2$)—175 cc.
  Powdered emulsifier—9 g.

Emulsions A and B were prepared by dispersing the powdered emulsifier in the mineral oil and then adding the water with agitation. The water-in-oil emulsions prepared above were both stable, exhibiting no separation of either phase after standing 1 month at room temperature or being aged 4 hours at 260° in a closed container.

EXAMPLE 3

Using the procedure of Example 1, the following emulsifier compositions were prepared.

(A) 1 mole of diethanolamine was reacted with 1 equivalent weight of the oxidized wax of Example 1. The calcium salt was prepared using the portions of Example 1.
(B) 1 mole of ethylenediamine was reacted with 2 equivalent weights of the oxidized wax of Example 1. The calcium salt was prepared as in Example 1.
(C) 1 mole of diethylenetriamine was reacted with 2 equivalent weights of the oxidized wax of Example 1. 250 g. of the oxidized wax of Example 1, 100 g. of 50% aqueous potassium hydroxide and 150 g. of 30% aqueous calcium chloride were reacted to form the calcium salt.

The following water-in-oil emulsions were prepared:

D
Mineral oil (250 SUS at 100° F.)—175 cc.
Fresh water—175 cc.
Emulsifier composition A—10 g.

E
Mineral oil (250 SUS)—175 cc.
Brine water (20% NaCl, 10% $CaCl_2$)—175 cc.
Emulsifier composition A—10 g.

F
Mineral oil (250 SUS)—175 cc.
Fresh water—175 cc.
Emulsifier composition B—10 g.

G
Mineral oil (250 SUS)—175 cc.
Brine water—175 cc.
Emulsifier composition B—10 g.

H
Diesel fuel—175 cc.
Fresh water—175 cc.
Emulsifier composition C—10 g.

I
Diesel fuel—175 cc.
Brine water—175 cc.
Emulsifier composition C—10 g.

The emulsions were prepared by dispersing the emulsifier in the oleaginous media and then adding water while agitating.

Emulsions D, E, F, G, H, I, were all stable after 1 month at room temperature and after about 2 hours aging at 260°. Slight separation was noted for Emulsions D, F and H, after 6 hours at 260°, and Emulsions E, G and I exhibited some separation after 12 hours at 260°.

EXAMPLE 4

The following emulsifier compositions were prepared:

Composition A 500 g. of an oxidized microcrystalline wax, having a saponification value of 75 and acid number of 30, and 45 g. of monoethanolamine were mixed together and heated at about 155° with agitation under a vacuum of about 26" Hg. After about 4½ hours the evolution of water ceased and the batch was cooled to about 115° and the vacuum was released. 500 g. of an oxidized paraffin wax having a saponification value of 125 and acid number of 40 was added to the hot reaction batch with continued agitation. After the wax melted, 130 g. of 50% aqueous potassium hydroxide was added slowly while agitation continued. When gelation started 500 g. of 50% aqueous aluminum sulfate $(Al_2(SO_4)_3 \cdot 18H_2O)$ was then added and rapid mixing was continued for ½ hour. The batch was then dried, cooled and ground to a powder.

Composition B (a) 500 g. of an oxidized Fischer-Tropsch wax, having a saponification value of 62 and acid number of 24, and 70 g. of diisopropanolamine were mixed and heated at about 160° with agitation under vacuum for 4½ hours. The product was then cooled and ground to a powder.

(b) In a separate reaction vessel, 500 g. of the Fischer-Tropsch wax used in part (a) was heated to about 120° and then 100 g. of 50% aqueous sodium hydroxide was slowly added with agitation. Additional water was added to maintain a proper consistency. The resulting product was then dried and ground to a powder.

Equal parts of the reaction products of parts (a) and (b) were then mixed and ground together.

Composition C (a) 500 g. of the oxidized microcrystalline wax used in Example 1 and 44 g. of monoisopropanolamine were reacted using the procedure in the preparation of Composition B of this Example 4.

(b) 500 g. of the oxidized microcrystalline wax used in Example 1 were melted in a separate container at about 110° and 65 g. of 50% aqueous potassium hydroxide were slowly added with agitation to the melted wax. Additional water was added to maintain a workable viscosity. After all the potassium hydroxide had been added, 150 g. of a 50% aqueous slurry of magnesium sulfate were added and the batch was maintained at a temperature of at least 110° with agitation for 30 mintes. The material was then dried, cooled and ground to a powder.

The reaction products of parts (a) and (b) were then mixed in equal proportions and co-ground.

Composition D 500 g. of the Fischer-Tropsch wax used in Composition B of this Example 4 and 120 g. of diethanolamine were reacted as described in Composition A of this Example 4, followed by adding 500 g. of an oxidized paraffin wax having a saponification value of 90 and acid number 28, and saponifying with 100 g. of 50% aqueous potassium hydroxide and forming the calcium salt by reacting with 40 g. of a 50% aqueous slurry of calcium hydroxide.

Composition E 1000 g. of the oxidized microcrystalline wax used in Example 2 and 65 g. of triethylene tetramine were heated together at about 175° with stirring and nitrogen gas bubbled through the mixture for 3 hours. The batch was then cooled to about 125° and 85 g. of a slurry containing 12.5 g. of potassium hydroxide, 30 g. of magnesium sulfate and 42.5 g. of water were added slowly with agitation. Agitation was continued for 30 minutes after the addition of the salt slurry after which it was dried, cooled and ground to a powder.

Composition F 500 g. of an oxidized paraffin wax, having a saponification value of 154 and acid number of 48, and 500 g. of an oxidized Fischer-Tropsch wax having a saponification value of 37 and acid number of 14 were heated together with 90 g. of monoethanolamine at 150° with agitation under a vacuum for 4 hours. The batch was then cooled to about 130° and 30 g. of 50% aqueous sodium hydroxide were slowly added with agitation. After all the sodium hydroxide was added, 35 g. of a 50% aqueous slurry of calcium hydroxide were added and mixing was continued for about 30 minutes. The batch was then cooled, dried and ground to a powder.

Emulsion A:
    Toluene—175 cc.
    Fresh water—175 cc.
    Emulsifier Composition A—10 g.
Emulsion B:
    Toluene—175 cc.
    Brine water—175 cc.
    Emulsifier Composition A—10 g.
Emulsion C:
    Mineral oil (250 SUS)—175 cc.
    Fresh water—175 cc.
    Emulsifier Composition B—10 g.
Emulsion D:
    Mineral oil (250 SUS)—175 cc.
    Brine water—175 cc.
    Emulsifier Composition B—10 g.
Emulsion E:
    Kerosene—175 cc.
    Brine water—175 cc.
    Emulsifier Composition C—10 g.
Emulsion F:
    Methylene chloride—175 cc.
    Fresh water—175 cc.
    Emulsifier Composition C—10 g.
Emulsion G:
    Diesel fuel—175 cc.
    Brine water—175 cc.
    Emulsifier Composition D—10 g.
Emulsion H:
    Mineral oil (150 SUS)—175 cc.
    Fresh water—175 cc.
    Emulsifier Composition E—10 g.
Emulsion I:
    Mineral oil (150 SUS)—175 cc.
    Brine water—175 cc.
    Emulsifier Composition E—10 g.
Emulsion J:
    Mineral oil (150 SUS)—175 cc.
    Fresh water—175 cc.
    Emulsifer Composition F—10 g.
Emulsion K:
    Mineral oil (150 SUS)—175 cc.
    Brine water—175 cc.
    Emulsifier Composition F—10 g.

The emulsions were prepared by dispersing the powdered emulsifier in the oleaginous material and water was then added with agitation.

All the emulsion compositions were stable after 1 month aging at room temperature. Emulsions A, B, J and K exhibited some separation after aging 2 hours at 260°. Emulsions C, D, E, F and G exhibited some separation after aging 4 hours at 260°. Compositions H and I exhibited no separation after aging 4 hours at 260°.

We claim:

1. An emulsifier composition comprising an admixture of:
    (a) between about 10% and 90% by weight of an oxidized hydrocarbon wax-amine condensation product, said oxidized hydrocarbon wax-amine condensation product being the product of the reaction of an oxidized hydrocarbon wax and a polyamine, said polyamine being a member of the class consisting of:
        (1) a polyamine having at least one primary and at least one secondary amino group; and
        (2) a polyamine having two primary amino groups separated by two or three carbon atoms; and
    (b) between about 90% and 10% by weight of a metal salt of an oxidized hydrocarbon wax, said metal salt selected from at least one member of the group consisting of alkali metals, alkaline earth metals, aluminum, copper, chromium and lead.

2. An emulsifier composition according to claim 1, in which the polyamine is at least one member selected from the group consisting of triethylene tetramine and tetraethylene pentamine.

3. An emulsifier composition according to claim 1, in which the oxidized hydrocarbon wax is at least one member selected from the group consisting of oxidized paraffin waxes, oxidized microcrystalline waxes, and oxidized Fischer-Tropsch waxes, said oxidized waxes having saponification values in the range of about 15 to about 160 and molecular weights in the range of about 330 to about 800.

4. An emulsifier composition according to claim 3, in which the oxidized wax is a Fischer-Tropsch wax having a saponification value in the range of about 25 to about 95, and an acid value in the range of about 10 to about 60.

5. An emulsifier composition according to claim 3, in which the oxidized wax is a microcrystalline wax having a saponification value in the range of about 25 to about 95, and an acid value in the range of about 10 to about 60.

6. An emulsifier composition according to claim 3, in which there are about 2 equivalent weights of the oxidized wax for 1 equivalent weight of the polyamine.

7. An emulsifier composition according to claim 1, in which the metal salt is a calcium salt.

8. An emulsifier composition according to claim 3, in which the metal salt is a calcium salt.

9. A stable water-in-oil emulsion comprising
    (a) from about 3 to about 99 parts by weight of water-immiscible oleaginous material;
    (b) from about 97 to about 1 parts by weight of water;
    (c) a small proportion of the emulsion composition of claim 1.

10. An emulsion according to claim 9, in which the oleaginous material is a mineral oil.

11. An emulsion according to claim 9, in which each of the emulsifier composition ingredients of claim 1 is present in an amount of at least 0.5% by weight of the emulsion.

12. An emulsion according to claim 11, in which the polyamine is at least one member selected from the group consisting of triethylene tetramine and tetraethylene pentamine.

13. An emulsion according to claim 11, in which the (a) ingredient constitutes from about 30 to about 70 parts by weight, and the (b) ingredient constitutes from about 70 to about 30 parts by weight.

14. An emulsion according to claim 13, in which the oxidized hydrocarbon wax is at least one member selected from the group consisting of oxidized paraffin waxes, oxidized microcrystalline waxes, and oxidized Fischer-Tropsch waxes, said oxidized waxes having saponification values in the range of about 15 to about 160 and molecular weights in the range of about 330 to about 800.

15. An emulsion according to claim 9, in which the metal is calcium.

16. A method of making an emulsifier composition corresponding to claim 1, which comprises condensing an oxidized hydrocarbon wax with an aliphatic polyamine, and saponifying unreacted oxidized hydrocarbon wax with an alkali.

17. The method of claim 16, in which the aliphatic polyamine is initially condensed with a part of the oxidized hydrocarbon wax, then the balance of said oxidized hydrocarbon wax is added, aqueous caustic alkali is added to the mass in molten form, and a polyvalent metal salt of a metal selected from the group consisting of alkaline earth metals, aluminum, copper, chromium and lead is added, under conditions of agitation, to form a polyvalent metal salt of the non-condensed oxidized hydrocarbon wax.

18. The method of claim 17 wherein the polyvalent metal salt of the oxidized hydrocarbon wax is an aluminum salt.

19. The method of claim 17 wherein the polyvalent metal salt of the oxidized hydrocarbon wax is a calcium salt.

References Cited

UNITED STATES PATENTS 3,088,796    5/1963    Kahler et al. _____ 252—357

JOHN D. WELSH, Primary Examiner

U.S. Cl. X.R.

106—277, 311; 252—8.55, 351, 357